United States Patent Office 3,251,807
Patented May 17, 1966

3,251,807
PROCESS FOR THE PRODUCTION OF POLY-
CARBONATE RESINS
Rudolph D. Deanin, West Hartford, Conn., and Ann V.
Pinter, Morristown, N.J., assignors to Allied Chemical
Corporation, New York, N.Y., a corporation of New
York
No Drawing. Filed Apr. 25, 1961, Ser. No. 105,509
2 Claims. (Cl. 260—61)

The present invention relates to a process for the preparation of polycarbonate resins from di-monohydroxyaryl-alkanes. More specifically the present invention resides in a process for the preparation of polycarbonate resins by phosgenating an aqueous alkaline solution containing a di-monohydroxyaryl-alkane, especially 2,2-(4,4'-dihydroxy-diphenyl)-propane, also known as p,p'-isopropyl-idenediphenol, hereinafter referred to as Bisphenol-A.

Polycarbonates are conventionally prepared by phosgenating an aqueous alkaline solution containing a di-monohydroxyaryl-alkane, a reaction catalyst, and a solvent for the polycarbonate resin. The molecular weight growth of the polymer occurs in solution, and, when the desired molecular weight has been attained, the polycarbonate may be separated from solution by any desired means, such as precipitation with a non-solvent for the polycarbonate resin, evaporation of solvent or distillation.

In order to prepare molding composition from polycarbonate resins temperatures on the order of 200–400° C. are preferably employed. Numerous disadvantages are attendant upon moldings prepared from the above polycarbonates at these elevated temperatures. The polycarbonates have been found to stick to the mold and discolor. In addition, molding at these elevated temperatures frequently gives molded products which are opaque and brittle. It is highly desirable to economically overcome the above disadvantages while retaining the good properties characteristic of polycarbonate resins.

It is, therefore, an object of the present invention to provide an inexpensive and expeditious method for the preparation of polycarbonate resins by the aqueous alkaline phosgenation procedure.

It is a further object of the present invention to prepare polycarbonate resins which may be molded at elevated temperatures without sticking to the mold.

It is a still further object of the present invention to provide polycarbonate resins which may be molded at elevated temperatures without evidencing discoloration.

It is another object of the present invention to provide polycarbonate resins which are not opaque or brittle upon molding at elevated temperatures.

It is an additional object of the present invention to prepare polycarbonate resins which accomplish the foregoing objects, while retaining the good properties characteristic of polycarbonate resins.

Additional objects and advantages of the present invention will appear hereinafter.

In accordance with the present invention we have found that polycarbonate resins may be prepared, which accomplish the above objects of the present invention, by (I) reacting together phosgene and a di-monohydroxylarylalkane in an aqueous alkaline medium; (II) recovering the resultant polycarbonate resin; (III) reacting said polycarbonate resin with at least 75 percent by weight of a saturated aliphatic alcohol containing from one to ten carbon atoms at a temperature of from about 25° C. to the boiling point of the alcohol; and (IV) recovering the polycarbonate resin. It is surprising and unexpected to find in accordance with the present invention that polycarbonate resins thus prepared do not evidence the undesirable characteristics heretofore discussed, and yet retain the good properties characteristic of polycarbonate resins.

In the di-monohydroxyaryl-alkanes to be used the two aryl radicals may be identical or different. Furthermore, the aryl radicals may contain substituents which cannot react during the conversion into polycarbonates, such as halogen or alkyl groups, e.g., methyl, ethyl, propyl or tertiary-butyl groups. The alkyl radical of the di-monohydroxy-alkanes linking the two benzene rings may consist either of an open chain or of a cyclaliphatic ring.

The following are examples of such di-monohydroxyaryl-alkanes:

(4,4'-dihydroxy-diphenyl)-methane,
2,2-(4,4'-dihydroxy-diphenyl)-propane (Bis-phenol-A),
1,1-(4,4'-dihydroxy-diphenyl)-cyclohexane,
1,1-(4,4'-dihydroxy-3,3'-dimethyl-diphenyl)-cyclohexane,
2,2-(2,2'-dihydroxy-4,4'-di-tert-butyl-diphenyl)-propane,
3,4-(4,4'-dihydroxy-diphenyl)-hexane,
1,1-(4,4'-dihydroxy-diphenyl)-1-phenyl-ethane,
2,2-(4,4'-dihydroxy-diphenyl)-butane,
2,2-(4,4'-dihydroxy-diphenyl)-pentane,
3,3-(4,4'-dihydroxy-diphenyl)-pentane,
2,2-(4,4'-dihydroxy-diphenyl)-3-methyl-butane,
2,2-(4,4'-dihydroxy-diphenyl)-hexane,
2,2,-(4,4'-dihydroxy-diphenyl)-4-methyl-pentane,
2,2-(4,4'-dihydroxy-diphenyl)-heptane,
4,4-(4,4'-dihydroxy-diphenyl)-heptane, and
2,2-(4,4'-dihydroxy-diphenyl)-tridecane.

These compounds can easily be produced in conventional fashion by condensation of aldehydes or ketones with phenols.

In addition mixtures of the foregoing di-monohydroxyaryl-alkanes may be employed.

The ratio of phosgene to di-monohydroxyaryl-alkane is not critical. Practically, however, at least 0.1 mole of phosgene per mole of di-monohydroxaryl-alkane should be employed. In theory, equimolar quantities of phosgene to di-monohydroxyaryl-alkane will fully consume the di-monohydroxyaryl-alkane; however, due to side reactions of the phosgene, it is preferred to employ from 1.1 to 1.5 moles of phosgene per mole of di-monohydroxyaryl-alkane. Greater amounts of phosgene may be employed, if desired, but the additional phosgene is unconsumed. Less than one mole of phosgene may also be advantageously employed; however, this does not utilize the di-monohydroxyaryl-alkane to the fullest extent.

The phosgene is preferably slowly introduced into an aqueous alkaline solution containing the di-monohydroxyaryl-alkane, generally over a period of time on the order of 15 minutes to four hours. When the reaction is run continuously, naturally the phosgene will be continuously introduced.

When all the phosgene has been added there generally follows a molecular weight growth period during which the reaction mixture is stirred and polycarbonate resin grows in molecular weight.

It is preferred to employ a suitable solvent for the polycarbonate resin in order to retain the polycarbonate in solution, since molecular weight growth occurs in solution. If no solvent is employed only low molecular weight polymer is produced and this polymer precipitates from solution substantially as fast as formed. The polymer should be soluble in the solvent which is employed, and the solvent should be substantially inert under the conditions of the reaction, immiscible in water and have a sufficiently high boiling point to allow for reaction at elevated temperatures, if desired. Generally speaking, it is preferred to employ a solvent which has a boiling point of 30° to 80° C. The solvent is preferably added initially and added in amounts so that the final polymeric solution is fluid. The amount of solvent is not critical, but practically from two to 500 parts by weight of solvent based on the polycarbonate formed should be used. Typical solvents include methylene chloride, benzene, cyclohexane, methylcyclohexane, toluene, xylene, chloroform, carbon tetrachloride, trichloroethylene, dichloroethane, methylacetate and ethylacetate.

It is preferred to employ a catalytic amount of a catalyst for the reaction, with any of the conventional catalysts being applicable. The catalyst is preferably employed in amounts from about 0.05 to about 5.0 percent by weight based on the di-monohydroxyaryl-alkane and it is preferred to employ a quaternary ammonium compound. Typical catalysts include the following: quaternary ammonium compounds, such as the halides or hydroxides, for example, benzyl triethyl ammonium chloride, tetramethyl ammonium hydroxide, benzyl trimethyl ammonium fluoride, octadecyl triethyl ammonium chloride, dodecyl trimethyl ammonium chloride, benzyl phenyl dimethyl ammonium chloride, cyclohexyl trimethyl ammonium bromide, etc.; tertiary amines, such as trimethyl amine, dimethyl aniline, diethyl aniline, etc. The use of these and other catalysts will be apparent to one skilled in the art. The catalyst may be added either before or after the phosgenation period.

The aqueous alkaline solution may be formed from an alkali metal base, and preferably an excess of base, such as lithium, sodium, or potassium hydroxide. In the aqueous alkaline solution the alkali metal salt of the di-monohydroxyaryl-alkane is formed.

The temperatures of the reaction may vary within a wide range, that is, the reaction may be conducted at room temperature or lower or higher temperatures as desired. Generally temperatures from the freezing point to the boiling point of the mixture may be utilized. It has been found that there is a tendency for molecular weight increase at the higher temperatures.

The polycarbonate resin may be recovered from solution after the desired molecular weight growth period by conventional means, for example, a non-solvent for the polycarbonate resin may be added to the reaction mixture in order to precipitate the polycarbonate resin. Typical non-solvents include methanol, isopropanol, etc. Other methods for recovery of the polycarbonate resin include steam distillation or evaporation of the solvent.

Potential chain terminators may be employed in the process of the present invention, in order to limit the molecular weights. Typical of such compounds are phenol, tertiary butyl phenol, chlorophenol, nonyl alcohol, butyl alcohol, etc.

Various additives may be employed, such as antioxidants, and additives to preferentially react with phosgene decomposition products. Typical of such additives are sodium dithionite, potassium bisulfite, carbon monoxide, etc.

The polycarbonate resin thus prepared is then reacted with at least 75 percent by weight of a saturated aliphatic alcohol at a temperature of from about 25° C. to the boiling point of the alcohol. The reaction is continued for at least one hour. The maximum time of reaction is not critical; however, it has been found that the reaction is preferably not continued for over 48 hours. The lower saturated aliphatic alcohols are preferred due to lower cost; however, any saturated aliphatic alcohol containing from one to ten carbon atoms may be advantageously employed in the process of the present invention. Typical alcohols include methanol, ethanol, butanol, isopropanol, n-propanol, hexanol, decanol, etc.

The preferred process of the present invention disperses the polycarbonate resin in the alcohol by stirring and the preferred operating temperature is at or about the boiling point of the various alcohols. This procedure is not critical, however.

The polycarbonate resin may be recovered from the saturated alcohol mixture by any convenient means, such as filtration, evaporation of alcohol, distillation, etc.

The reaction that occurs between the saturated alcohol and the polycarbonate is not fully understood. In accordance with much of the information at hand it is hypothesized that the saturated alcohol reacts with the chlorocarbonate chlorine of the polymer to form compounds lower boiling than the alcohol or soluble in the alcohol. It is hypothesized that chlorocarbonate chlorine contributes to the poor properties evidenced when the polymer is molded at elevated temperatures.

The polycarbonates obtained by the present process have the desirable characteristics of polycarbonates, and may be easily processed into valuable formed articles or coatings by compression molding, extrusion, injection molding or flame spraying. The polycarbonates obtained by the present process can also be processed into films and fibers, which can be oriented by stretching. By this stretching operation the strength of these products is considerably increased, while elongation is decreased. The polycarbonates produced by the present process can also be processed in combination with plasticizers or with fillers such as asbestos or glass fibers.

The following examples will further illustrate the present invention.

EXAMPLE 1

*Preparation of a polycarbonate resin by phosgenation*

The reaction was run in a one-liter resin flask equipped with a dip tube, water seal anchor stirrer, thermometer, and cold reflux condenser. Under a stream of nitrogen two-tenths mole of bis-phenol-A was dissolved in 500 ml. distilled water containing 0.82 mole of sodium hydroxide. Fifteen ml. methylene chloride (40 grams per hundred polymer) and 1 gram of benzyl triethyl ammonium chloride catalyst were added. The two phases were stirred for sixty minutes at 25° C. while three-tenths mole of phosgene was bubbled in. An additional fifteen minutes stirring at 25° C. was allowed after phosgenation.

The solid polymer was filtered from the reaction mixture, washed with dilute sulfuric acid, and then to neutrality with water.

EXAMPLE 2

*Reaction between the resin of Example 1 and methanol*

The resin of Example 1, 50.5 grams, was immersed for ten hours in 505 grams of boiling methanol under a reflux condenser. After the ten hour reaction period the resin was filtered from the reaction mixture and dried. The resultant resin contained 0.15 percent chlorine, compared with 0.80 percent chlorine in the untreated resin, and melted at from 227° to 232° C., compared with 198° to 204° C. in the untreated resin. The resin was molded at 265° C. to give a clear disc of pale yellow color. The polymer would not stick to the mold surface and the resulting disc did not evidence brittleness; compared with the untreated polymer sticking to the mold and giving a discolored, opaque and brittle disc.

The following chart illustrates chlorine content of the polycarbonate resin prepared in a manner after Example 1 and treated after a manner of Example 2, after several successive stage treatments with methanol.

| Example | Methanol Treatment | Percent Chlorine Content |
|---|---|---|
| 3 | None | 4.8 |
| 4 | 1 hr./25° C | 2.4 |
| 5 | 1 hr./65° C | 0.64 |
| 6 | 24 hr./65° C | 0.16 |

EXAMPLE 7

A resin prepared in a manner after Example 1, 31 grams, was immersed for ten hours in 310 grams of boiling methanol under a reflux condenser. After the ten hour reaction period the resin was filtered from the reaction mixture and dried. The resultant resin contained 0.64 percent chlorine, compared with 4.8 percent chlorine in the untreated resin, and melted at from 227° to 232° C., compared with 198° to 204° C. in the untreated resin. The resin was molded at 265° C. to give a clear disc of clear amber color. The polymer would not stick to the mold surface and the resulting disc did not evidence brittleness; compared with the untreated polymer sticking to the mold and giving a discolored, opaque and brittle disc.

A polycarbonate resin was prepared in a manner after Example 1 and contained 4.6 percent chlorine. The polymer was immersed in various alcohols and heated for 24 hours on a steam bath under reflux condenser. The polymer was then filtered off and dried overnight in a circulating air oven. The resultant polymer was analyzed for chlorine and tested for thermal degradation by heating first for two hours at 250° C., then for two additional hours at 278° C., and noting the discoloration. The results are indicated in the following chart.

| Example | Alcohol | Percent Chlorine Content | 2-Hour Aged Color at— | |
|---|---|---|---|---|
| | | | 250° C. | 278° C. |
| 8 | Untreated | 4.6 | Amber | Dark Brown. |
| 9 | Methanol | 0.95 | Lt. Amber | Red Amber. |
| 10 | Ethanol | 0.2 | ----do---- | Do. |
| 11 | Butanol | 0.5 | ----do---- | Lt. Amber. |

The present invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

We claim:
1. A process for the preparation of a methanol-polycarbonate resin which comprises:
 (I) reacting together phosgene and 2,2-(4,4'-dihydroxy-diphenyl)-propane in a molecular ratio of from about 1.1 to 1.5:1 in an aqueous alkaline medium in the presence of an inert solvent which is immiscible in water and in the presence of a catalytic amount of a quarternary ammonium compound as a catalyst;
 (II) recovering the resultant polycarbonate resin from the reaction mixture of (I);
 (III) reacting said polycarbonate with at least about 75%, by weight, based on the weight of said polycarbonate resin, of methanol at a temperature of from about 25° C. to the boiling point of said methanol for at least about one hour; and
 (IV) recovering the resultant methanol-polycarbonate resin from the reaction mixture of (III).
2. A methanol-polycarbonate resin prepared according to the process specified in claim 1.

References Cited by the Examiner
UNITED STATES PATENTS

| | | | |
|---|---|---|---|
| 2,946,766 | 7/1960 | Schnell | 260—47 X |
| 2,970,131 | 1/1961 | Moyer | 260—47 X |
| 3,036,040 | 5/1962 | Lee | 260—47 X |
| 3,065,204 | 11/1962 | Dietrich et al. | 260—47 X |
| 3,155,635 | 11/1964 | Deanin et al. | 260—47 X |

MURRAY TILLMAN, *Primary Examiner.*

HAROLD N. BURNSTEIN, SAMUEL H. BLECH, JOHN C. MARTIN, *Assistant Examiners.*